(12) United States Patent
Parkinson

(10) Patent No.: US 12,441,442 B2
(45) Date of Patent: Oct. 14, 2025

(54) SUPVERT—STAND UP PADDLE BOARD VERTICAL RACKING SYSTEM

(71) Applicant: Nathan Daniel Haarsma Parkinson, Lethbridge (CA)

(72) Inventor: Nathan Daniel Haarsma Parkinson, Lethbridge (CA)

( * ) Notice: Subject to any disclaimer, the term of this patent is extended or adjusted under 35 U.S.C. 154(b) by 0 days.

(21) Appl. No.: 18/677,743

(22) Filed: May 29, 2024

(65) Prior Publication Data

US 2025/0121914 A1  Apr. 17, 2025

Related U.S. Application Data

(60) Provisional application No. 63/589,623, filed on Oct. 11, 2023.

(51) Int. Cl.
*B63B 32/83* (2020.01)

(52) U.S. Cl.
CPC .................................. *B63B 32/83* (2020.02)

(58) Field of Classification Search
CPC .. B63B 32/83; B65G 1/14; B60R 9/08; B60R 9/00; B60P 3/40; A47B 81/00; A63C 17/0006; A63C 17/017; A63C 2203/44; A63C 17/01
See application file for complete search history.

(56) References Cited

U.S. PATENT DOCUMENTS

| | | | | |
|---|---|---|---|---|
| 2,963,182 | A * | 12/1960 | Geiger | B65H 49/38 414/343 |
| 4,690,467 | A * | 9/1987 | Imbert | A47B 81/00 232/1 D |
| 5,641,076 | A * | 6/1997 | Englund | B65G 49/062 206/454 |
| 6,591,988 | B2 * | 7/2003 | Trpkovski | B65D 19/44 206/386 |
| 11,694,495 | B1 * | 7/2023 | Al-Rawaf | G06K 19/0723 235/385 |
| 2003/0164347 | A1 * | 9/2003 | Bouvier, Jr. | B63B 32/83 211/187 |
| 2014/0032447 | A1 * | 1/2014 | Fisher | B63B 32/83 211/85.7 |
| 2015/0090722 | A1 * | 4/2015 | Sanger | B65D 88/546 220/544 |
| 2016/0296821 | A1 * | 10/2016 | Field | A47B 43/006 |
| 2020/0039616 | A1 * | 2/2020 | Builder | B63C 1/02 |
| 2023/0245519 | A1 * | 8/2023 | Marconicchio | G07G 1/009 700/237 |
| 2024/0208615 | A1 * | 6/2024 | Tian | H02J 7/0044 |

* cited by examiner

Primary Examiner — Ko H Chan

(57) ABSTRACT

The SUPVERT rack is a multipurpose storage rack for rigid stand up paddleboards. The vertical, parallel tracks facilitate SUP board display and storage in the most space efficient manner. The SUPVERT rack does not contain any full height partitions between boards; rather it uses stacked parallel tracks for spacing, thereby drastically reducing the overall footprint. The versatility of the rack allows it to be used for static displays, freight crates, or mobile SUP business operations.

6 Claims, 7 Drawing Sheets

Figure 1 - SUPVERT rack as shown from the rear access point, Without SUP Boards
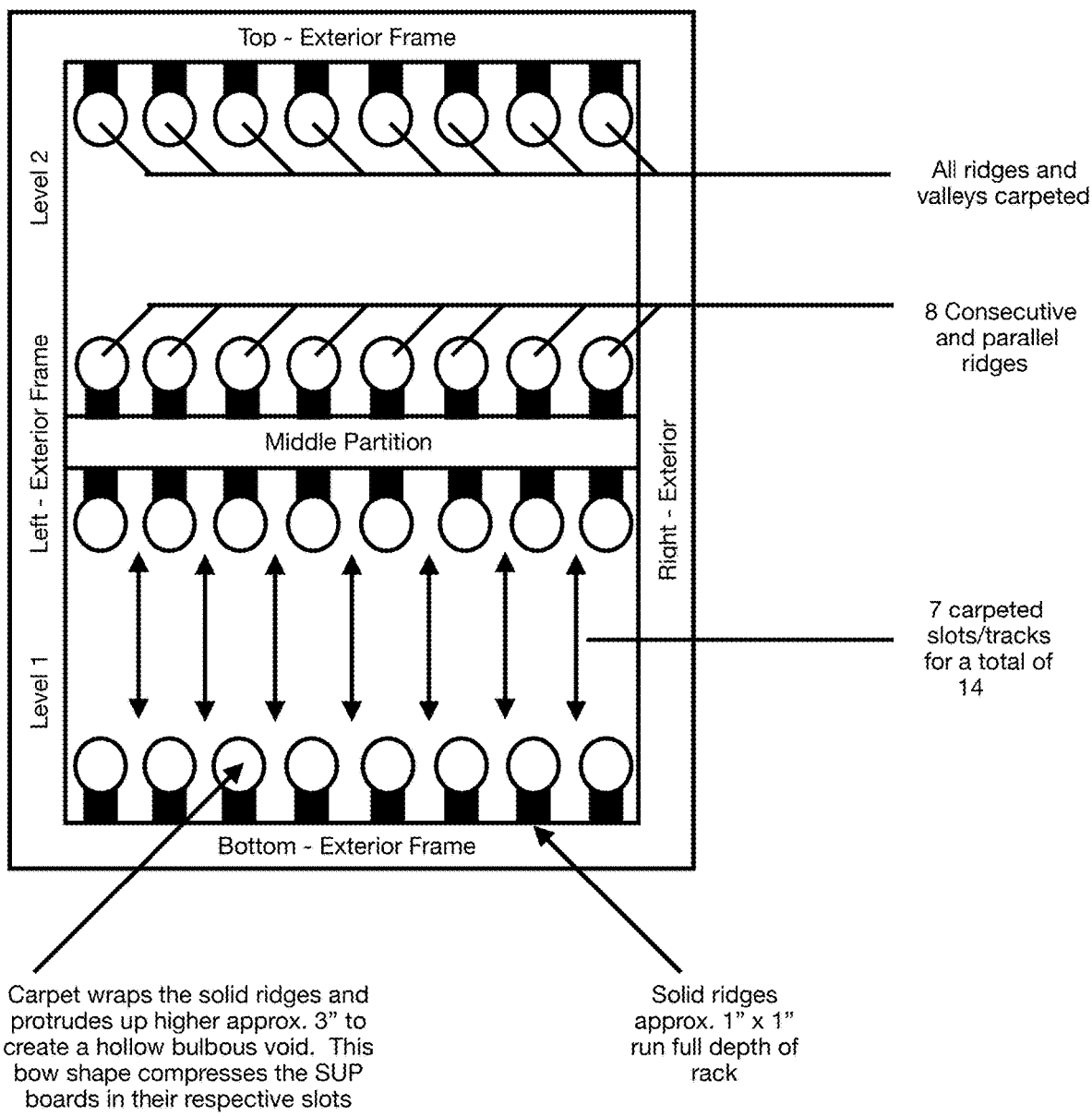

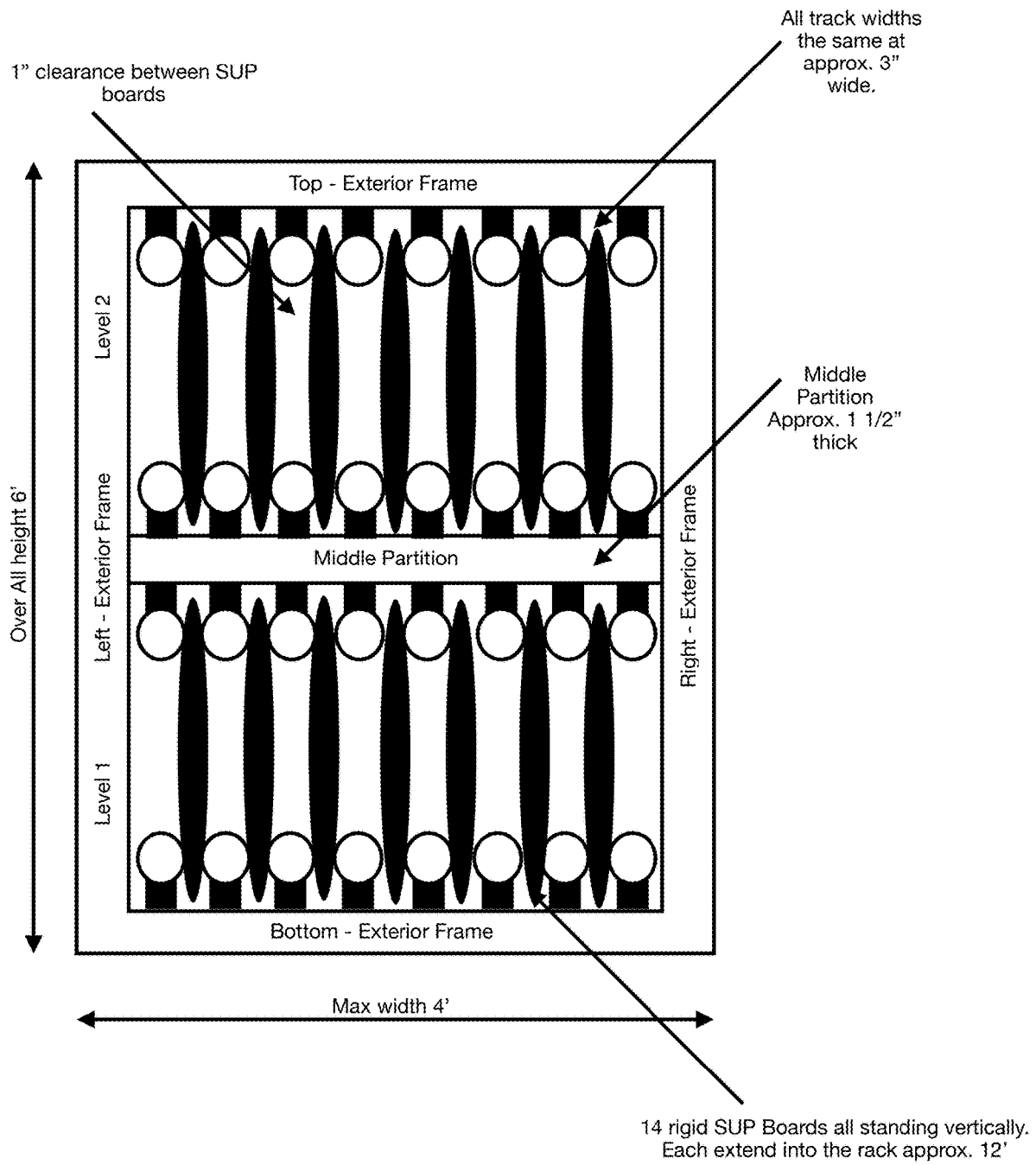
Figure 2 - SUPVERT rack as shown from the rear access point with SUP Boards.

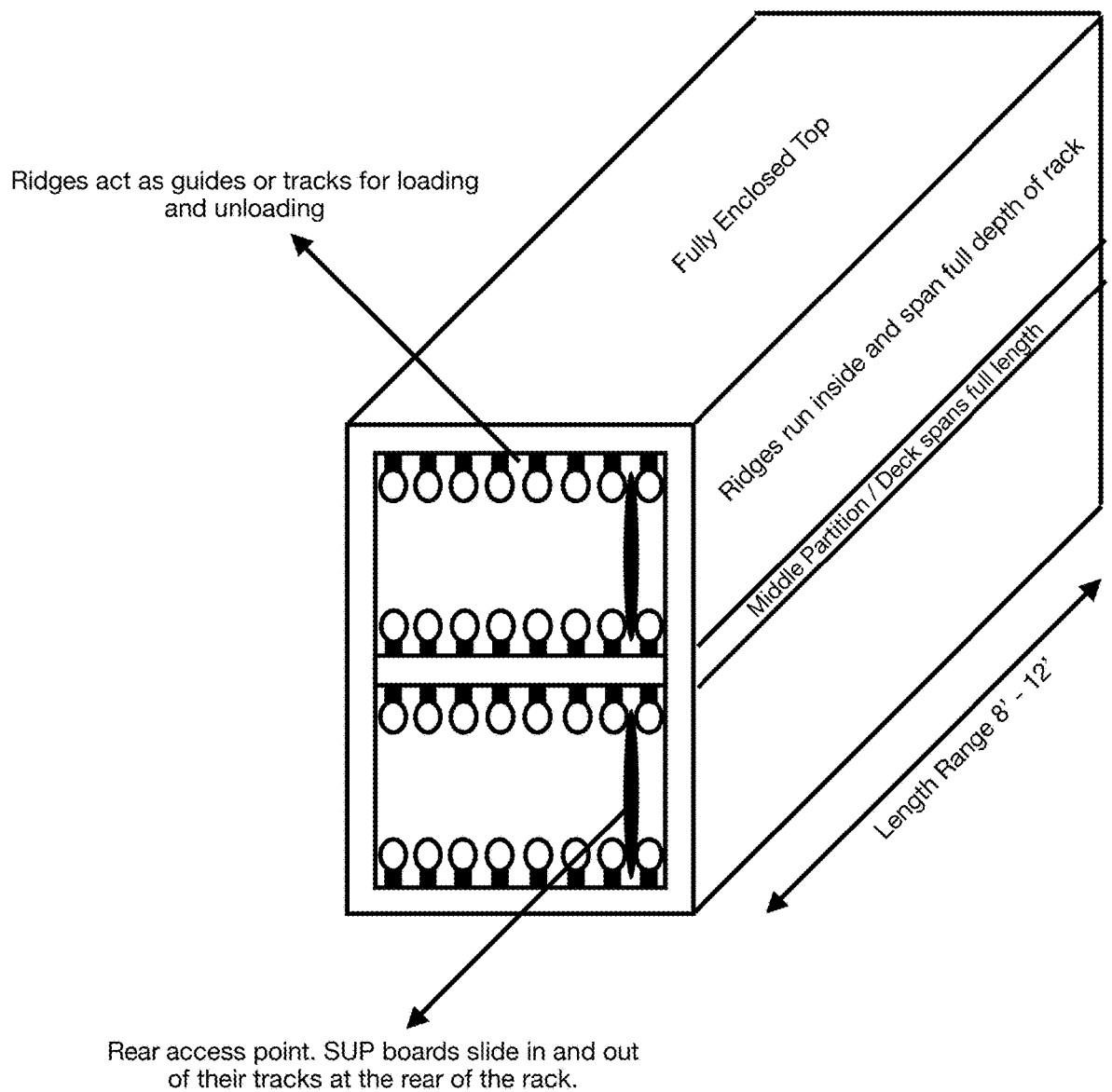
Figure 3 - SUPVERT rack side view

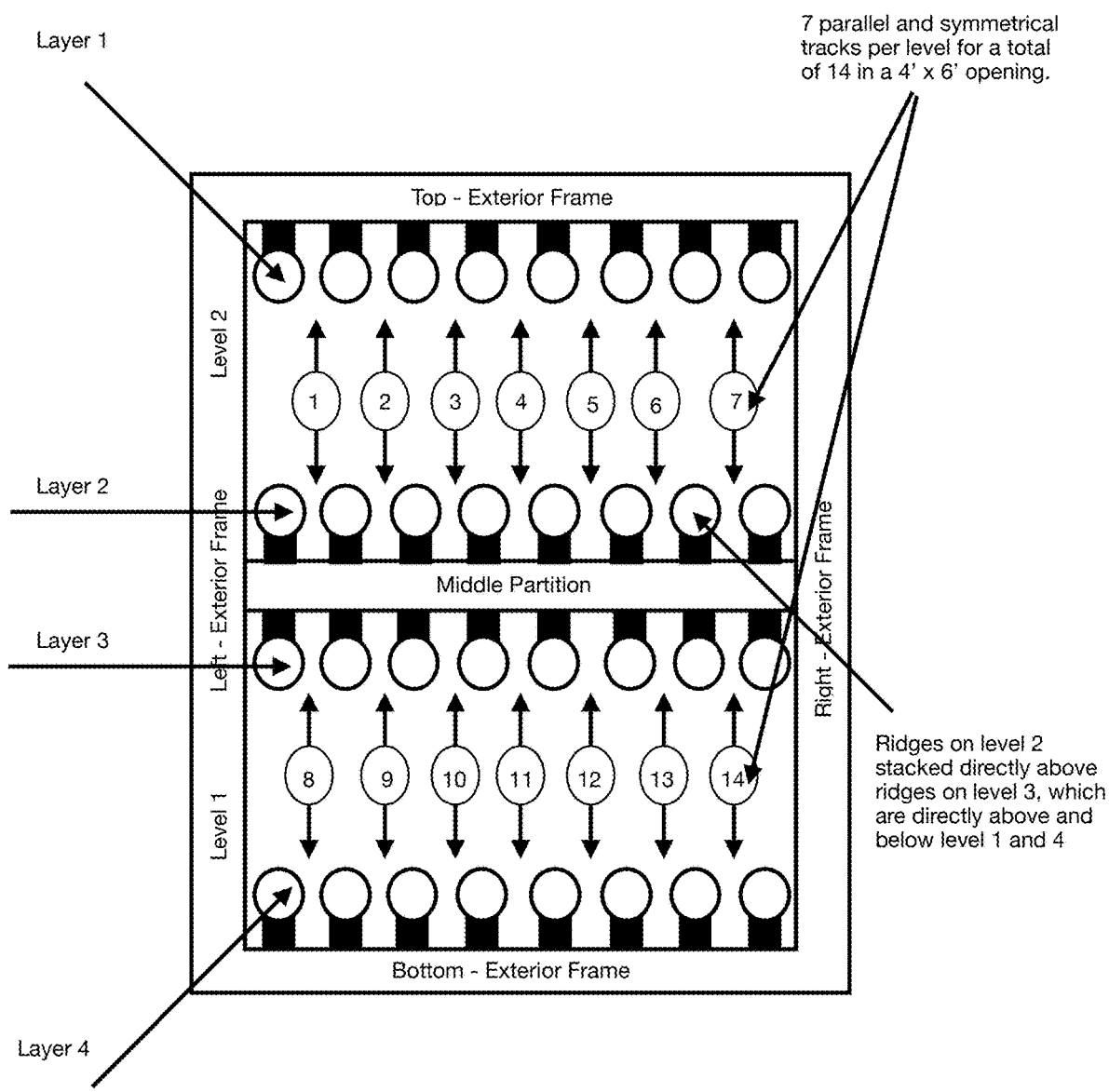
Figure 4 - SUPVERT showing all 4 layers and levels

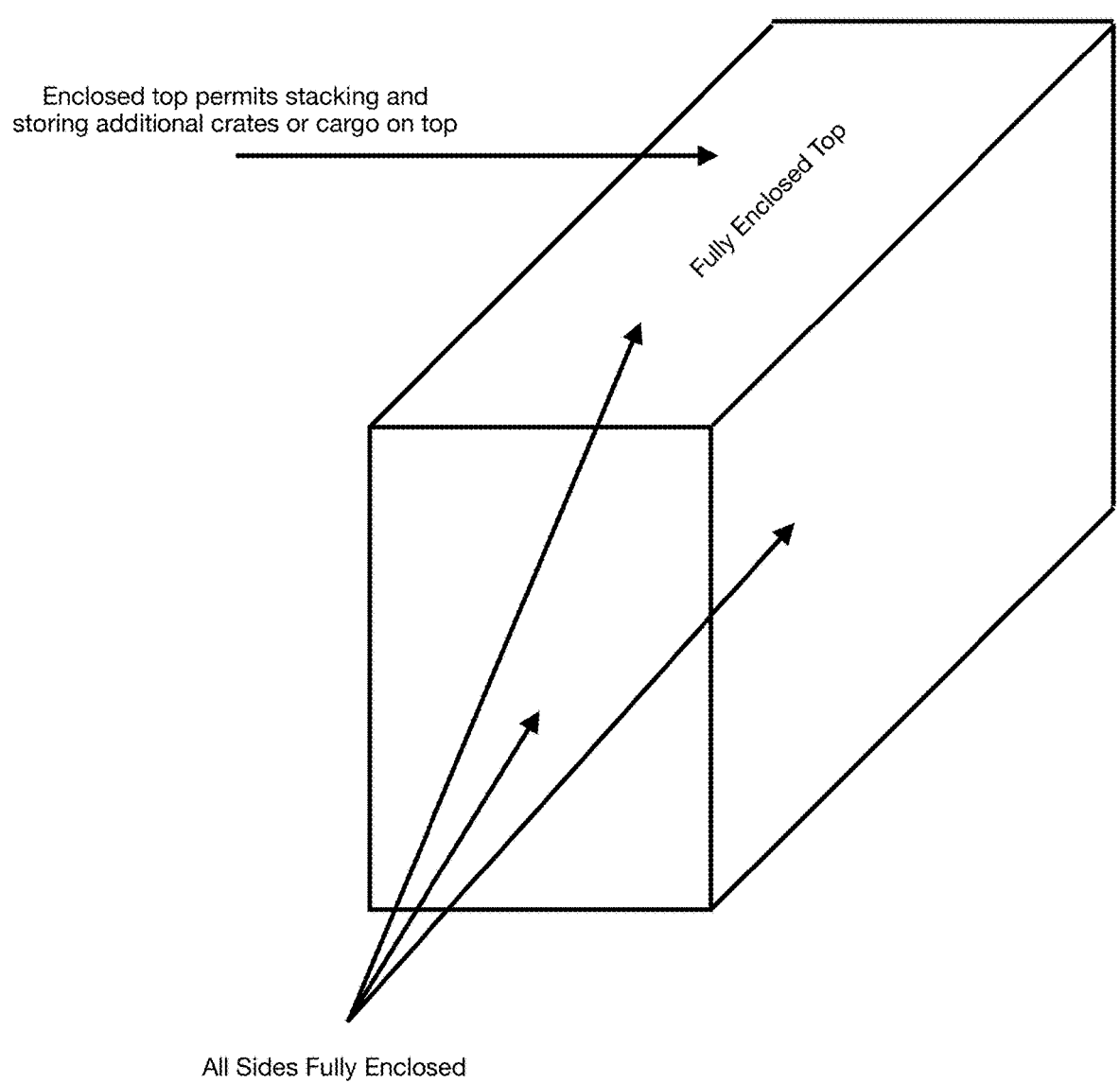
Figure 5 - SUPVERT as a shipping or storage crate

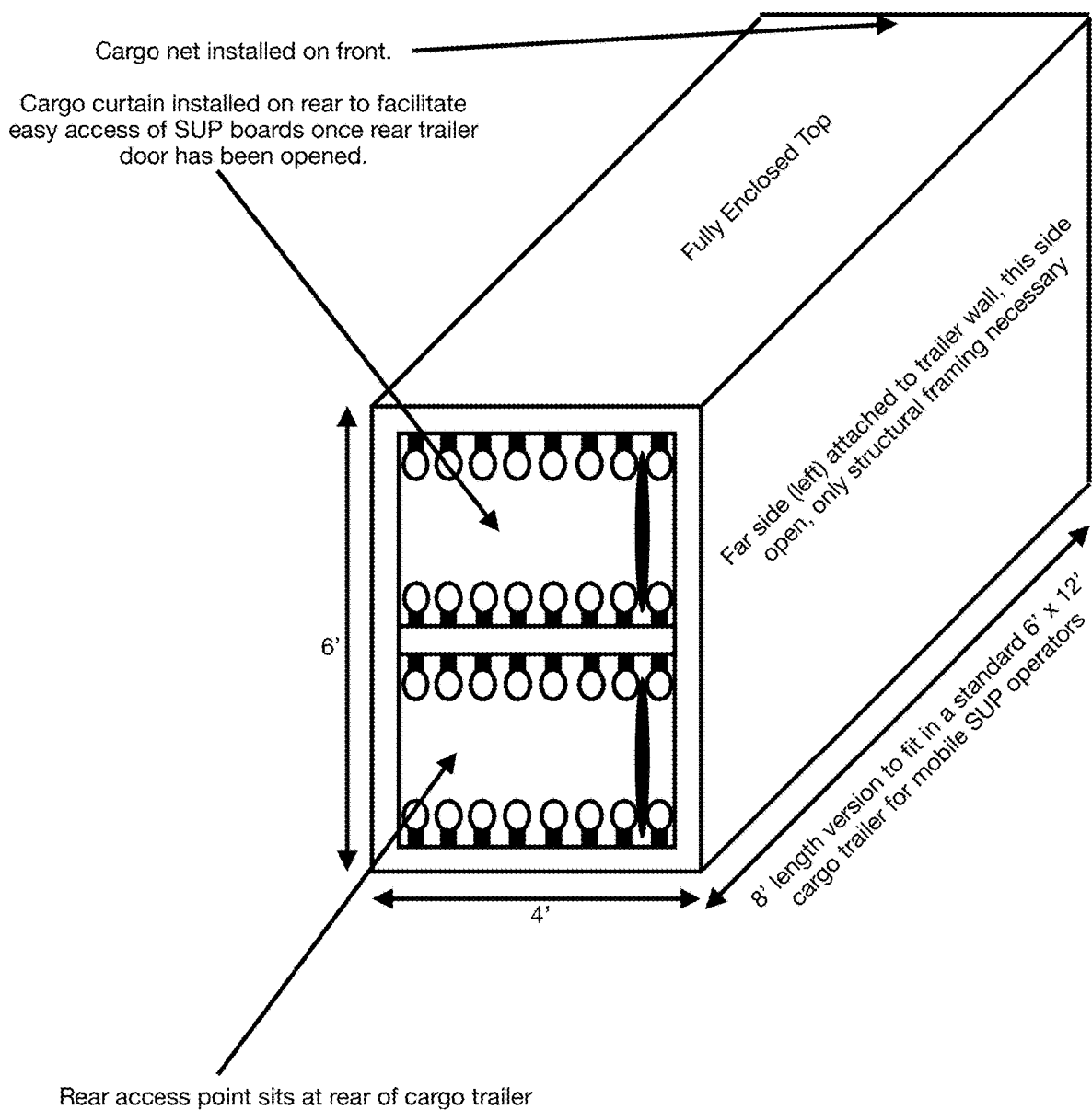
Figure 6 - SUPVERT as a mobile application

Figure 7 - SUPVERT as a retail display
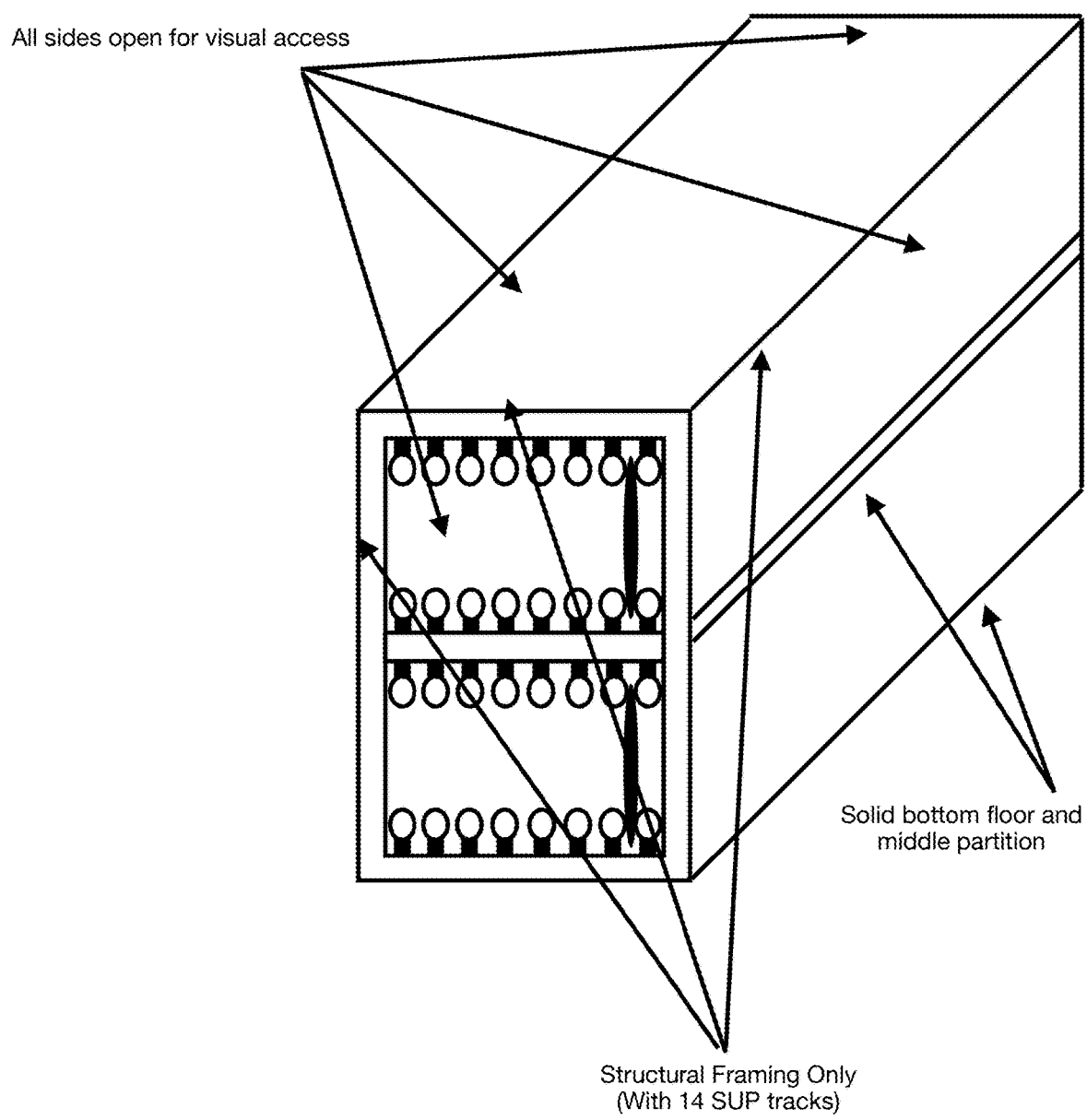

SUPVERT—STAND UP PADDLE BOARD VERTICAL RACKING SYSTEM

BACKGROUND OF THE INVENTION

The field of art to which this invention pertains is; Rigid (Non-Inflatable) Stand up Paddleboard (SUP) Storage, Shipping, Handling and Transporting.

The known problems with this field of art are these: Loading, Unloading, Shipping, and Storing of the aforementioned boards is cumbersome and requires large amounts of space, especially when dealing with large quantities of boards. Rigid SUP Boards are very long, minimum 10-12 ft. long and approx. 2 ft. wide. Additionally, SUP manufacturers specifically state not to ship, stack, or store these boards in the horizontal (flat) position. The inherent curvature of the SUP boards, makes them susceptible to warping, sagging and even breakage, when not handled correctly.

There are 3 existing rack styles for SUP boards:
1. Lie flat style (Horizontal)
2. Shelf arms extending at a 45 or 90 deg. Angle
3. Vertical single level rack with U Shaped center partitions.

The first two of these options are contrary to manufacturer recommendations, all require large amounts of space, and all leave the SUP boards vulnerable to damage. Lastly, none of the aforementioned systems allow for two levels of stacked SUP boards.

The SupVert specifically solves these issues. SupVert facilitates the shipping, storage transport, loading and unloading of numerous SUP boards, in the most structurally supportive VERTICAL position, while meeting or exceeding the manufacturers specifications. Furthermore, it does so in a manner that is quicker, more efficient, and more environmentally friendly.

SUMMARY OF THE INVENTION

The SupVert solves this problem by utilizing a padded top and bottom track system, with no center or dividing partitions. SUP boards slide in and out of the track in the vertical position. Numerous SUP boards are lined up vertically and can be stacked at least 2 layers high. A standard SupVert rack would facilitate 14 boards. (7 on the bottom row and 7 on the top row)

The distinct advantages of the SupVert are these:
The crucial distinguishing feature is the lack of center dividers or partitions between boards. This makes it mathematically the most space efficient way to ship, stack and store rigid SUP boards.
Simple and cost effective to build
Easily adaptable to numerous applications ex. Shipping crates, retail displays and storage
Intuitive and easy to use.
More Environmentally Friendly—Traditional methods of shipping and storing SUP boards involve: plastic packaging, styrofoam, and cardboard. This packaging more than doubles the thickness of the original product. Even when packaged in this manner, manufacturers print on the box, "Do Not Lie Flat" and "Do Not Stack".
Customers who spend upwards of $1,000.00 USD on 1 board wish to inspect it before purchase, which requires opening the packaging before purchase.
SUP boards shipped or stored using the SupVert system, need only be wrapped in transparent plastic or vinyl wrap. Once slid into the SupVert they are structurally strong, protected and take up considerably less space.
If the SupVert is constructed strong enough and walls attached, it would allow LTL carriers to stack additional freight on it, and around it.
SupVert uses include: mobile application for recreational SUP operators, Retail displays, warehouse storage and Freight Carriers.
The nature of this invention is to solve the need for a suitable method of transporting numerous SUP boards. There are many mobile SUP rental companies that use cargo vans or open trailers to transport their boards. There is currently no available racking designed solely for this purpose. SupVert maximizes space, is secure from a cargo perspective, and exceeds manufacturer shipping recommendations.

BRIEF DESCRIPTION OF THE DRAWINGS

FIG. 1 SupVert rack as shown from the rear access point without SUP Boards.

FIG. 2 SupVert rack as shown from the rear access point with SUP Boards.

FIG. 3 SupVert rack side view (Ridges run full length of the SUP board).

FIG. 4 Bottom, Middle, and Top Sections of carpeted track view (Each track level numbered)

FIG. 5 SupVert as a shipping crate, allowing freight to be stored on top

FIG. 6 SupVert as a mobile application—cargo net front and rear for easy access

FIG. 7 SupVert as a Retail Display or Storage (Depicts Open top)

DETAILED DESCRIPTION OF THE INVENTION

The SupVert racking system is mathematically the most compact, secure and structurally sound method of transporting, and storing rigid SUP boards. Our working prototype resides in a 6'×12' cargo trailer and doubled the amount of boards we are able to transport.

As shown in FIG. 4, the SupVert rack incorporates 4 layers of 7 parallel tracks for a total of 14. Each layer is lined up directly above the one beneath it. FIG. 1 shows each layer is composed of 7 tracks and 8 consecutive and parallel ridges. FIG. 3 shows these ridges run the full length of the rack, and act as top and bottom guides for the board. FIG. 1 shows each side of the ridge, and the bottom is padded with commercial grade carpet. The carpet bows up higher than the ridge structure, forming a hollow bulbous space. This makes the slot size flexible and universal to different SUP board widths. The carpet also reduces friction when sliding boards in and out of the rack. Lastly, the carpet has the added benefit of protecting the boards from scratches and provides cushioning while shipping. Loading and unloading the rack is done from the rear, by sliding boards into their respective tracks. (See FIG. 3)

Sup boards are designed similar to a typical aerofoil. The bottom is flat and the top is convex. This is done for stability reasons; however, it makes the boards thickest in the center. Any existing vertical racking systems utilize some form of full-length center partitions. Using partitions triples or quadruples the amount of space required. Furthermore, none of the existing racks facilitate stacking.

The tracks in the SupVert rack are aligned and spaced to accommodate the thinnest part of the board—the edges. Boards lined up sequentially in the SupVert rack have a mere 1" clearance between each board and only 1½" clearance between levels. (FIG. 2) This is crucial when operating a mobile business. This translates into being able to haul 14 boards in a 6' wide trailer instead of only 7 or 8.

Once the rack is loaded with boards it can be enclosed with walls and act as a shipping or storage crate. (FIG. 5). For rental companies who wish to operate out of a cargo trailer the front and rear of the rack would utilize a cargo net to facilitate quicker access. (FIG. 6). Lastly when used as a retail display the top and ends would be left open for visual purposes. (FIG. 7)

The ease of use for this rack is impressive. We have taken several months to build and re-design our prototype until it facilitated minimum clearance spacing and still be universal for almost all rigid SUP boards. An exhaustive search revealed there was no racking suitable for this purpose. Our necessity for a functional solution led to our design and implementation of this unique racking system.

The invention claimed is:

1. A rack system for holding rigid, non-inflatable, aerofoil-shaped stand-up paddle boards (SUPs), comprising: a rectangular frame including a top exterior frame, a bottom exterior frame, a left exterior frame, and a right exterior frame, collectively defining a perimeter; a fully enclosed housing comprising a top wall panel, bottom wall panel, front wall panel, left side wall panel, and right side wall panel, each of said wall panels fixed to the rectangular frame; an open rear access side opposite the front wall panel, configured to receive a removable fastener for securing a flexible net or a rigid closure wall panel; an interior, horizontal, middle partition panel fixed within the rectangular frame, dividing the rack system into substantially equal upper and lower compartments; a plurality of fixed, parallel, longitudinally aligned carpeted ridges and valleys, each referred to respectively as a ridge or valley, disposed within each compartment, each ridge and valley affixed directly to an interior-facing surface of the bottom wall panel, the top wall panel, or [both] a top and bottom sides of the interior horizontal middle partition panel; wherein the plurality of carpeted ridges define a repeating corrugated pattern forming alternating compressible support surfaces and receiving spaces, the ridges being arranged in vertically spaced tiers within the rack system, each tier being configured to securely support SUP boards in a vertical, longitudinal arrangement; wherein each ridge comprises a solid base wrapped in carpet to form a compressible, bulbous surface configured to apply compressive engagement against the longitudinal side edges of each SUP; and wherein said ridges and valleys are spaced and configured to support the SUPs with a compression fit that enables sliding insertion and removal along a linear path between laterally adjacent ridges, the SUPs being supported in said vertical longitudinal arrangement throughout the rack system.

2. The rack system of claim 1, wherein the ridges and valleys form a repeating corrugated pattern extending across four vertically spaced tiers, comprising: a bottom tier; a top tier; and a middle tier formed by the interior, horizontal, middle, partition panel and defining a second tier and third tier, the middle tier including a SUP-supporting surface on the top side of the interior horizontal middle partition panel and another SUP-support surface on the bottom side of the interior horizontal middle partition panel, said SUP-supporting surfaces corresponding to the second and third tiers, respectively.

3. The rack system of claim 1, wherein the ridges are shaped and positioned to support the thinnest cross-sectional dimension of the SUPs, which corresponds to the SUPs longitudinal side edges.

4. The rack system of claim 2, wherein the ridges in the four vertically spaced tiers are aligned directly above or below corresponding ridges in vertically adjacent tiers, and wherein each of the four vertically spaced tiers include laterally spaced ridges positioned to support individual SUPs on their longitudinal side edges, such that the rack system provides support for up to fourteen SUPs.

5. The rack system of claim 1, wherein each SUP can be individually removed from or inserted into the rack system without removal or rearrangement of SUPs in laterally adjacent positions.

6. The rack system of claim 1, wherein the carpeted ridges provide protective cushioning during transport, secure upright storage, and a low coefficient of friction to facilitate sliding access of the SUPs.

* * * * *